United States Patent [19]
Goss et al.

[11] 3,983,550
[45] Sept. 28, 1976

[54] AURAL-VISUAL PRODUCT DISPLAY

[75] Inventors: Stanley B. Goss, Pepper Pike; Martin J. Nagel, Northfield Center; Ole K. Nilssen, Chagrin Falls, all of Ohio

[73] Assignee: Tenna Corporation, Warrensville Heights, Ohio

[22] Filed: Jan. 25, 1974

[21] Appl. No.: 436,523

[52] U.S. Cl. .............................. 340/221; 40/106.1; 360/72; 340/334
[51] Int. Cl.² .......................................... G09F 9/00
[58] Field of Search ............. 340/221, 334; 360/72, 360/106, 12, 78–80; 40/106.1

[56] References Cited
UNITED STATES PATENTS

| | | | |
|---|---|---|---|
| 2,944,116 | 7/1960 | Vershoven | 360/72 |
| 3,161,729 | 12/1964 | McCarty et al. | 360/106 |
| 3,309,686 | 3/1967 | Lester | 340/221 |
| 3,320,604 | 5/1967 | Baer | 340/221 |
| 3,388,911 | 6/1968 | Wilson et al. | 360/106 |
| 3,511,940 | 5/1970 | Lemelson | 360/72 |
| 3,676,868 | 7/1972 | Poumakis | 360/78 |
| 3,696,358 | 10/1972 | Vasku | 340/221 |
| 3,751,825 | 8/1973 | Barrett | 40/106.1 |
| 3,886,590 | 5/1975 | Walker et al. | 360/78 |

*Primary Examiner*—Marshall M. Curtis
*Attorney, Agent, or Firm*—Watts, Hoffmann, Fisher & Heinke Co.

[57] ABSTRACT

An aural-visual display system especially suitable for visually displaying a number of items, such as products, and playing a recorded message relating to a displayed item in response to actuation of a selector corresponding to the item. One of a number of different messages on a magnetic tape are selectively played by changing the positional relationship between a magnetic pickup and the message location on the tape, in response to operation of a selector. This concurrently produces a visual display associated with the selected item to which the message relates.

22 Claims, 5 Drawing Figures

AURAL-VISUAL PRODUCT DISPLAY

BACKGROUND OF THE INVENTION

This invention relates to a system for selecting and emitting one of a number of recorded groups of signals, messages or information. It more particularly relates to an audio-visual system that plays one of a number of available recorded messages and makes a visible display relating, e.g., to one of a number of products in response to operation of one of a plurality of selectors.

Systems are known that play different records in response to selection indicators or switches, such as jukeboxes or the like, or that selectively play a series of different pieces, selections, or messages, but in the order recorded. Multi-track tape players are also known that permit track selection by moving a pickup head to successive tracks each time a single selection switch is actuated. Some of these or similar types of playback systems have been proposed for use in advertising displays and vending machines, to play a message correlated with associated wares. Most of these systems are complex and would be relatively expensive to manufacture, requiring, for example, separate players to provide optimum selection of choices. Such mechanisms may further require the actuation of plural switches or multiple actuation of a single switch to make a selection, may permit multiple selection or interruption, or have other aspects presently viewed as disadvantageous.

A present need exists for a reliable, inexpensive system that provides full flexibility for selection of a recorded message with one actuation of a single selector associated with each message and without necessitating record changing or multiple playback systems, and that will prevent further message selection during play. A need also exists for an audio system of that type coupled with a visual indication relating to the audio message to make available a practical product display to advertise or aid in selling products.

SUMMARY OF THE INVENTION

The present invention relates to an improved system that meets the above needs and others, and is especially useful for playing recorded messages associated with displayed products, serving in that manner as a sales aid. In such use, it will typically include a display of products. A number of selectors, corresponding to the number of products, will be provided. Upon actuation of one of the selectors by a prospective purchaser, a prerecorded message will be played relating to the product corresponding to the selector actuated. The message, for example, might explain the features of the product. Concurrently, a visual display is advantageously produced, as by a lamp energized in response to the selector to illuminate the particular product or to present a visual message providing additional information or emphasis. Between messages, displayed products that may be operable for demonstration purposes can be energized.

The system utilizes a medium on which groups of related signals are stored, i.e., recorded. Most advantageously a multi-track magnetic tape is used on which are stored multiple groups of information, such as messages. A transducer, such as a magnetic tape pickup and an associated amplifier are used to convert the signals and produce an aural output through a speaker, although the production of a visual display is an alternative, as through a cathode ray tube. A number of messages are provided on the medium and the operation of one of a number of selectors, such as switches of an electrical control circuit, permit selection of the messages. Once a selector is actuated, all selectors are electrically disconnected from the control circuit until the message has been completed, preventing the interruption of the message being played or the selection of another message in advance of the completion. In addition, where the displayed products themselves might be operated to potentially interfere with the message, power to the products is also automatically disconnected once a selector is actuated.

The positional relationship of the transducer with the medium carrying the recorded messages is changed upon the actuation of a selector unless the transducer is already in a position to play the selected message. This is accomplished automatically by producing relative movement between the transducer and the medium, to locate the transducer and recorded message in cooperative relationship. In the preferred embodiment, each group of information or message is contained on a separate parallel track of a magnetic tape loop. The transducer is moved across the tape to select the desired message. A plurality of transducers can be used to provide further selection in each step or position of the transducer, by selectively utilizing only the output from one or the other of the transducers. Movement of the transducer or transducers relative to the medium is initiated by a selector and thereafter is automatically controlled through a program selection indicator and a memory and comparator circuit so that movement will continue until the transducer that is to play the message is positioned opposite the portion of the medium on which the message that corresponds to the selector is recorded.

Several important desiderata are achieved with the present invention. Any number of messages are selectable in any order, and the selection is simple, i.e., a single operation of a selector, such as a switch, related to a displayed product, will result in the playing of a message relating to the product. The message is played without significant delay by providing ready access to each recorded message on the medium. A subsequent message cannot be selected nor can the message being played be interrupted until completion of any message. This has the advantage of preventing someone from preselecting several recorded messages and then leaving the display. Also, a displayed product cannot be operated to interfere with the audio presentation of the message. A visual indication is made and coordinated with the product if desired, along with the audio message. The message is automatically stopped upon completion, reactivating the selector circuit for subsequent selection of a message and shutting off all electrical power to the system. The messages are readily changeable, so that the display can be used for different products and the medium used to record the messages is a conventional medium so that new messages can be readily recorded and used with the system. In the preferred embodiment, an inexpensive and compact player for conventional two channel 8-track stereo tapes is used with modifications and novel control circuitry to permit eight separate messages to be selected and played from a single unit. The system is readily expandable by interconnecting additional player units so that the selectors are interdependent, to increase the capacity in multiples of eight messages for each additional unit.

From the above, it will be appreciated that an object of this invention is to provide a new and improved system for selecting and emitting any one of a plurality of recorded groups of information through the actuation of a single one of a plurality of selectors, and especially to relate the information to a selected product or the like and to associate a visual display with an audio message.

The above and other features, objects and advantages of this invention will become more apparent as the invention becomes better understood from the detailed description that follows, when considered in connection with the accompanying drawings.

DESCRIPTION OF PREFERRED EMBODIMENTS

Figure 1:
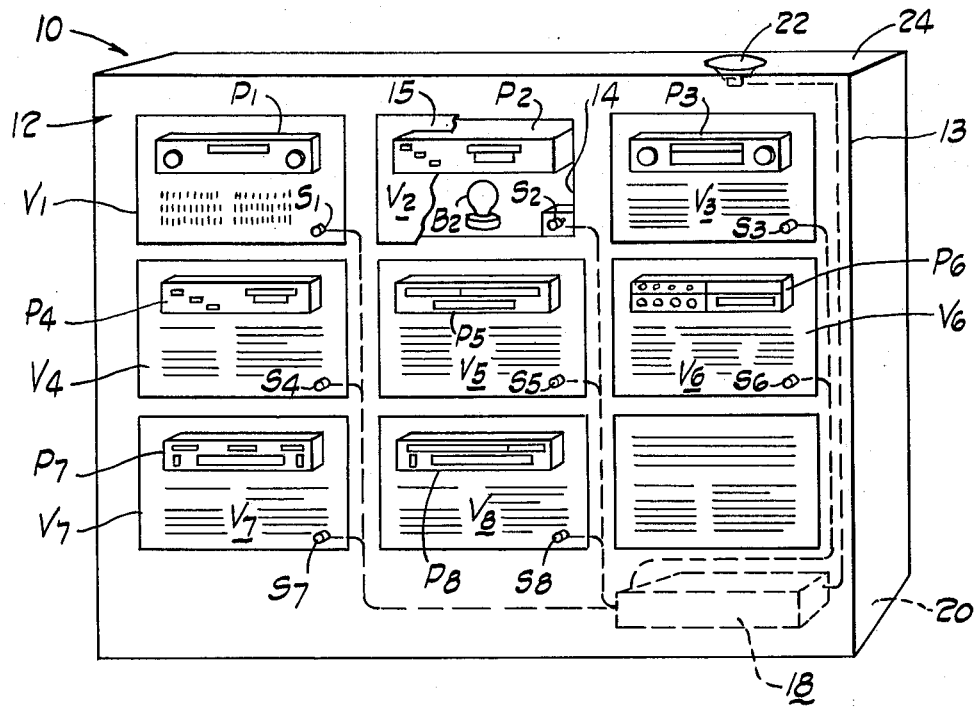
FIG. 1 is a diagrammatic perspective view of an audio-visual product display embodying the present invention.

With reference first to FIG. 1, a product display is indicated generally by reference numeral 10. The purpose of the display is to exhibit a number of products to potential purchasers and to emit a recorded message related specifically to a product selected by the potential purchaser. At the same time, the display visually accentuates the selected product so that both a visual and an audio presentation are concurrently provided.

The display is formed of a support 12, for example, a plywood panel 13 that serves to display a plurality of products P1-P8 is an upright manner. The products may be secured to the front face of the panel or extend outwardly from apertures or the like.

A plurality of visual displays V1-V8 are provided adjacent each product P1-P8. In this embodiment, openings 14 are formed in the panel 13 so that light from lamps B1-B8 will be visible through the panel. A translucent screen 15 covers each opening and carries a printed message or the like relating to the adjacent product and made distinctively visible when the associated lamp B1-B8 behind is energized.

Selectors S1-S8, such as electrical switches, are physically associated with each product P1-P8. In the embodiment shown, each is directly adjacent a product. A tape player and control circuit unit 18 capable of playing a separate message for each product is supported behind the panel 13, on a horizontal support 20. A speaker 22 connected to the tape player and control circuit unit 18 is also carried by the support 12 at a location where it can be adequately heard from in front of the panel 13. In this embodiment it is secured to a top panel 24 behind the face panel 13. Momentary actuation of a selector S1-S8 causes the unit 18 to play a recorded message relating to the product P1-P8 associated with the selector and to energize a lamp B1-B8 associated with the product. In some instances the speaker through which the message is played may be one of the products.

Figure 2:
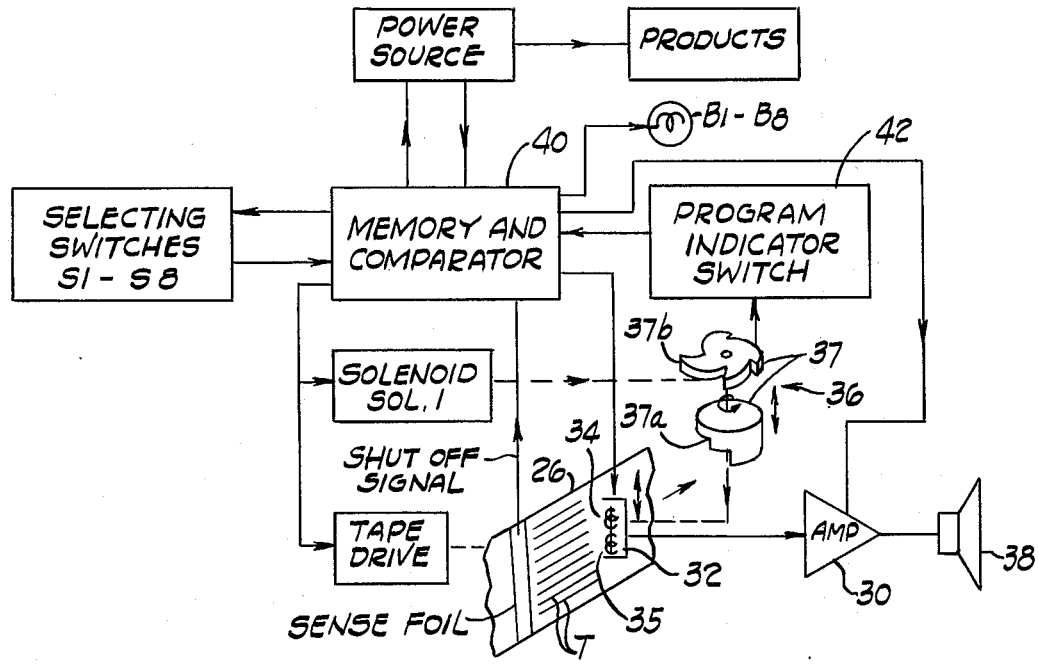
FIG. 2 is a block diagram of the audio-visual system for presenting a message and illuminating the display of FIG. 1.

The functional relationship of the system components is indicated diagrammatically in FIG. 2 of the drawings. The actuation of one of a plurality of selectors S, such as electrical switches S1-S8, accomplishes the following basic functions through a memory and comparator circuit: (1) the selection of a message relating to the product that is correlated on the display with the actuated selector, (2) initiation of relative movement between a medium on which the message is recorded, such as an 8-track tape loop 26, and a transducer 34 or 35 for sensing the message, (3) energization of an amplifier unit 30 to emit an audio message recorded on the tape, and (4) energization of a lamp B1-B2 associated with the selected product. A slight unrecorded gap is provided at the beginning of the tape to permit time to correlate the transducer and selected message locations before the beginning of the message has passed the pickup.

Selection of the message is controlled by the memory and comparator circuit through a solenoid SOL1 and a program indicator switch 42. In response to actuation of a selector, the memory and comparator circuit (a) controls operation of the solenoid to move, if necessary, a transducer carrier 32 transversely across the tape 26, (b) stores in a memory a condition indicative of the position to which the transducer should be moved to play the message relating to the actuated selector, (c) selects for operation one of two transducers or pickups 34, 35 located opposite different tracks of the tape, so that one of two tracks is selected for use in the position to which the transducer carrier 32 will be moved, (d) starts a tape drive motor 28, (e) connects the entire system to a power source, (f) disconnects the selectors from the circuitry, (g) detects the position of the transducer through the position indicator switch 42 and compares it with stored condition of the memory, (h) stops movement of the transducer carrier at the appropriate place, (i) activates an appropriate one of lamps B1-B8, (j) removes power from potentially interfering products, and (k) shuts off all power to the system, allows re-selection, and re-connects power to the displayed products when applicable.

Figure 3:
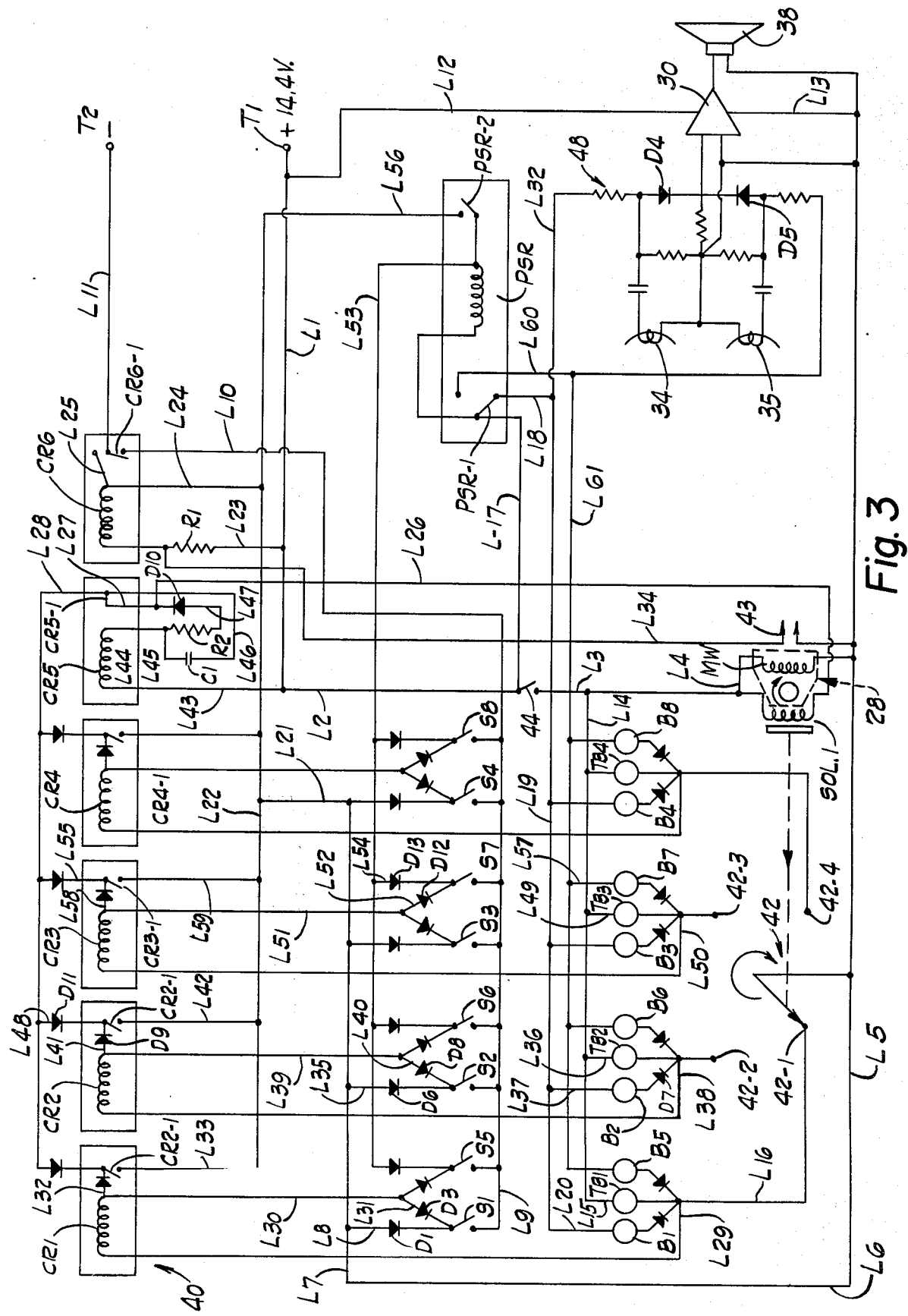
FIG. 3 is a circuit diagram illustrating a preferred circuit and tape player arrangement for selecting and playing a message and illuminating a display, in accordance with the present invention.

A detailed memory and comparator electrical circuit 40 and associated components is shown diagrammatically in FIG. 3, illustrating one specific manner in which selectors S1-S8 will select one of eight messages and illuminate one of eight products in response to a single actuation, while preventing subsequent actuation of other switches until the selected messages has been completed. Advantageously from a cost standpoint, certain parts of the system illustrated in FIGS. 2 and 3 are conventional to known 8-track stereo tape cartridge players. These parts particularly comprise the tape drive motor 28, a solenoid actuator SOL1, a rotary cam assembly 36 for stepping the transducer carrier 32 (FIG. 2) across the width of the tape in response to each actuation of the solenoid, magnetic pickups 34, 35 carried by the transducer carrier 32 and located to cooperate with parallel tracks T on the tape, an audio speaker 38, a program indicator lamp switch 42 operated by the solenoid SOL1 and here utilized in a new manner, shutoff contacts 43 operated by a tape sense foil, and a power control switch 44 operated by the tape cartridge. A single amplifier 30 and an electronic switch circuit 48 to selectively activate only one of the two pickups 34, 35 replace the conventional dual amplifier of a stereo tape player so that each track of the tape can be played independently.

A conventional tape cartridge with eight parallel recording tracks T on a continuous tape loop 26 (FIG. 2) is used as the medium for carrying the recorded message in the preferred embodiment. A metallic sense foil on the tape loop follows the end of each message. Most conveniently, all eight messages are substantially equal in length. Either the tape loop is of a length corresponding to the length of the messages or it is larger in multiples of the message lengths and duplicate sets of all eight messages follow one another, separated by foils. This latter arrangement has the advantage of reducing tape replacement occasioned by wear of the tape and sense foil as it is played.

Eight selectors, specifically electrical switches S1-S8 (FIG. 3), control the position of the transducer carrier 32 (FIG. 2) through circuit controlling program memory relays CR1-CR4. The selector switches S1-S8 are isolated from the memory and comparator circuit immediately after actuation by a relay CR6, which establishes a holding circuit for the memory and comparator circuits until completion of the selected program and which disconnects the switches. A memory relay will not be latched if the transducer is already in the proper position. Isolation of the switches also opens the power circuit to any potentially interfering electrically energized products that are displayed.

A solenoid pulsing relay CR5 begins operating when a memory relay is latched and causes the solenoid SOL1 to operate a number of times, the number depending upon the position of the carrier 32 and which memory relay CR1-CR4 is energized. Solenoid SOL1 advances the transducer carrier 32 one step each time it is actuated to a different positional relationship across the width of the tape loop.

The advancing mechanism for the transducer carrier, identical to that conventionally used in 8-track stereo cartridge players, uses a rotatable cam 37 (shown in two parts for illustration but typically unitary) with steps 37a on a radial face and notches 37b in the peripheral face. The cam is advanced in ratchet-like fashion by the action of solenoid SOL1 or the action of an associated solenoid controlled mechanical power amplifier on the peripheral notches. Rotation serves to move the transducer carrier vertically by the action of the face steps on the carrier, which is slidable on a post, through four steps across the width of the tape, then moving the transducer carrier back the full width of the tape to the initial position. Thus, each time the solenoid SOL1 is energized, the position of the transducer carrier will be changed relative to the tape so that the individual pickups 34, 35 will be positioned adjacent different tracks.

An arm of switch 42 is also advanced, if required, by the solenoid SOL1, through as many as necessary of four contacts 42-1, 42-2, 42-3 and 42-4, until it reaches the contact associated with the energized memory relay, deenergizing it, and in turn causing the pulsing relay to be stopped and connecting the appropriate one of lamps B1-B8 to the current source independently of the selectors or memory circuit. Four contacts and four memory relays suffice for eight tracks because of the concurrent selection of one of two pickups which lie opposite two tracks in each position of movement.

A pickup selector relay PSR with two sets of contacts and associated circuitry serves to connect half of the lamps, i.e., lamps B1-4 in one condition and the other half, i.e., lamps B5-B8 in the other condition. At the same time, through the other set of contacts, it permits use of one or the other of the two pickups 34, 35.

Various diodes and circuit wires are provided and arranged in the circuit 40 (FIG. 3) and are shown in standard fashion. Corresponding switches and lamps are given related numbers, i.e., switch S1 and lamp B1 correlate. The circuit and its operation will be described in detail in connection with three examples of switch actuation for selecting messages related to three different products or items. The circuit operation in the case of the other available selections will be apparent thereafter.

FIRST EXAMPLE Assume a tape cartridge is in proper position for playing, closing the switch 44. Also assume the switch 42 to be in the position shown in FIG. 3 and a customer wishes to listen to a message about product P1. Selector S1 is then actuated. This example will illustrate the condition where the transducer carrier is already located at a position corresponding to that of the selected switch and the pickup selector relay PSR is in a deenergized condition to provide utilization of the pickup 34 being positioned opposite the track of the tape loop corresponding to the message relating to product P1. It should be noted that pickup 34 is arranged to be opposite one of the four tracks of the tape that carry messages corresponding to the products selected by the switches S1, S2, S3 and S4 in each position of the transducer carrier and pickup 35 cooperates with the remaining four tracks in response to switches S5, S6, S7 and S8.

The circuit 40 (FIG. 3) is connected between two terminals T1 and T2, the terminal T1 being at a direct current voltage of 14.4 volts above that of terminal T2, which is considered as ground. Upon the actuation of the switch S1, the following functions are accomplished:

1. The tape motor 28 is energized to move the tape past the transducers. This is accomplished through the establishment of a circuit from T1, through lines L1, L2, switch 44, lines L3, L4, motor coil MW of tape drive motor 28, to line L5, which is connected to ground through lines L6, L7, L8, diode D1, actuated switch S1, and lines L9, L10, normally closed switch CR6-1, and line L11 to terminal T2.

2. The amplifier 30 is energized to produce an audio output from the message on the tape through a circuit established from terminal T1, through lines L1 and L12, and through line L13 to line L5 (ground).

3. The lamp B1 associated with the selected product P1 is energized. The circuit is from terminal T1, through lines L1, L2, L17, through closed switch PSR-1 of the relay PSR, through lines L18, L19, and L20 to lamp B1, illuminating the display, and through diode D2, line L16, switch 42 with its contact at contact 42-1, to line L5 (ground).

At the same time, a parallel circuit through switch 44 is established through lines L3, L14, L15, through a test bulb TB1 internally of the circuit indicating which circuit is operating and which permits completion of the circuit even if the lamp B1 should be burned out, there joining the other circuit at line L16 and being connected to ground through the switch 42.

4. The switch circuit of switches S1–S8 is isolated after momentary contact of the switch S1, from the circuit, so that further switches cannot be actuated to change the selected program. This is accomplished because, upon closing of the switch S1, the line L7 connected to L5 through L6 is at ground potential, as in paragraph 1 above. Line L21 connects line L22 to line L7, establishing a circuit through the holding circuit relay CR6 from terminal T1, through lines L1, L23, resistor R1, relay coil CR6, and line L24 to line L22. Relay CR6 is latched to pickup switch CR6–1, connecting line L25 to line L11 and terminal T2, which holds the relay CR6 energized. Contact CR6–1 is a "make-before-break" contact so terminal T2 is continuously connected to the circuit. Lines L7, L21 and L22 are now grounded through line L24 to line L25, and the switches S1–S8 are thereafter ineffective because common line L9 is no longer connected to terminal T2 through switch CR6–1. By connecting any electrically energized products P1–P8 across lines L1 and L9 or L10, the power to the products will be disconnected as soon as the switches S1–S8 are isolated.

5. The transducer carrier 32 (FIG. 2) stays in its present position, with the pickup 34 opposite the tape track having a message corresponding to the product P1 and switch S1. The solenoid SOL1 is not actuated. Actuation of the solenoid SOL1 depends upon a circuit being established through one of the memory relays CR1–CR4, as will become apparent from subsequent examples. Where the arm of switch 42 is already at the contact 42–1, 2, 3, 4 associated with the memory relay associated with the actuated selector switch S1–S8, the relay circuit is shunted and the relay never operates.

6. Pickup or transducer 34 is energized by a modulated signal from the magnetic tape, and the output from the transducer is picked up by the amplifier 30 because a current is applied to a forward biased diode D4 and not to a second forward biased diode D5 in the circuit of pickup 35. The diode D4 is biased by virtue of the position of relay PSR contacts PSR–1, which establishes a circuit from terminal T1, through lines L1, L2, L17, PSR–1, lines L18 and L32.

With the establishment of the above conditions, the message recorded on the tape is played to completion, with the tape loop either returning to its inital position or moving to a position where a duplicate set of messages are located so that the start of subsequent messages are adjacent the transducers 34, 35. Upon reaching that position, a foil portion of the tape completes the circuit across the contacts 43 in line L34, shunting the play control holding relay CR6 by connecting line L1 through line L23, resistor R1 and line L34 to line L5 (ground). This unlatches the relay, returning the contact CR6–1 to its initial position for the next operation. It also disconnects L24 and hence lines L22, L21, L7, L6 and L5 from ground, to break the circuit to the tape motor winding MW and to the amplifier 30. No power is now drawn from the power supply because the circuit L11, CR6–1, L10 and L9 terminates at open selector switches. Re-selection is now allowable.

SECOND EXAMPLE

With the circuit of FIG. 3 in the condition shown, i.e., with the switch 42 at position 1 and the pickup selector relay PSR in the condition shown to utilize pickup 34, assume the switch S2 is closed to select a message corresponding with the product P2.

The tape drive motor 28 is started in the same manner as in Example 1, i.e., with a circuit from lines L1, L2, switch 44, lines L3, L4, motor coil MW and lines L5, L6, and L7, but the path from line L7 is now through the lines L35 and diode D6, switch S2, to line L9 and ground.

Memory relay CR2 is energized through a circuit from terminal T1, lines L1, L2, switch 44, lines L3, L14, L36, test bulb TB2, line L38, relay coil CR2, lines L39, L40, diode D8, switch S2 to line L9 (ground). Also a parallel path through line L17, contacts PSR–1, lines L18, L19 and lamp B2 to line L38 is established. Actuation of relay CR2 closes switch CR2–1 and a holding circuit is established through the coil CR2, line L41, diode D9, contacts CR2–1, line L42 to line L22 which is now grounded to line L9 through lines L21, L7, L35, diode D6 and switch S2.

With line L7 grounded through switch S2, line L22 is grounded through line L21 and holding or play control relay CR6 is energized, as previously described, establishing a direct ground connection from line L22 through lines L24, L25, CR6–1 and line L11, holding relay CR6 latched and disconnecting the switches S1–S8.

The amplifier 30 is energized as soon as line L5 is grounded through line L9, and subsequently through line L22, as in the first example.

Next, the transducer carrier must be moved by the solenoid SOL1 and the switch 42 advanced, to play the proper message and illuminate the proper lamp. This is accomplished by the solenoid pulser relay CR5, which is actuated a number of times to step the cam 37 (FIG. 2) and advance the switch arm 42 until the arm connects with the contact 42–2 with which the actuated switch S2 is associated to deenergize memory relay CR2.

As long as memory relay CR2 is energized, solenoid pulser relay CR5 will operate on and off, making and breaking the circuit to solenoid SOL1, so that the solenoid steps the cam 37 that moves the transducer carrier 32 (FIG. 2). In this instance, one actuation of the solenoid SOL1 will move the transducer carrier one step, and advance the arm of switch 42 one contact in order to position the transducer and pickup 34 adjacent the proper track of the tape, to play a message corresponding to the product associated with the switch S2.

The solenoid pulser relay CR5 is energized from the terminal T1, through lines L1, L43, L44, and parallel circuits formed by line L45, capacitor C1, line L46, to line L28 and through resistor R2, line L47, diode D10, line L27, closed relay switch CR5–1, to line L28. Thence, the circuit continues through lines L29, L48, diode D11, closed switch CR2–1, line L42, to line L22, which is connected to ground. The capacitor C1 and the resistor R2 control the response time of the relay CR5, the capacitor maintaining the flow through the coil of the relay even after the switch CR5–1 opens, until the capacitor is charged. The capacitor then slows the energization of the coil after switch CR5–1 closes, by raising the potential at line L44 because of the resistor R2, as the capacitor discharges. As long as there is a path through a closed switch CR1–1, CR2–1, CR3–1, or CR4–1, to line L22, the relay CR5 will continuously make and break the contacts CR5–1.

When switch CR5–1 is closed and, as in this instance, when a memory relay switch (i.e., CR2–1) is latched, a circuit is established through solenoid SOL1 to advance the transducer carrier one step and the arm of switch 42 one step. This is accomplished through the circuit from terminal T1, lines L1, L2 switch 44, line L3, SOL1, lines L26, L27, switch CR5–1, lines L28, L48, diode D11, switch CR2–1, and lines L42 and L22, to ground. When the switch CR5–1 opens, the solenoid SOL1 is deenergized and the mechanism for mechanically advancing the cam 37 (FIG. 2) returns via a spring to a position suitable for again advancing the cam.

The contact of switch 42, having now advanced from contact 42–1 to contact 42–2, shunts the circuit through line L38 previously established to the relay CR2 by connecting contact 42–2 to line L5, to ground. This opens the relay switch CR2–1 deactivating the pulser relay CR5 and stopping further actuation of the stepping solenoid SOL1. Play of the tape then proceeds as in example 1.

Third Example

With the circuit of FIG. 3 in the condition shown, assume selector S7 is closed to select a message for a product correlated with the selector S7.

The tape drive motor 28 is started by grounding line L5 through the selector switch S7. This is accomplished by energizing the pickup selector PSR to close switch PSR–2. This is accomplished through a circuit from terminal T1, through lines L1, L2, L17, coil PSR, lines L53, L54, diode D13, switch S7, lines L9, L10, switch CR6–1, line L11, to terminal T2. This closes contact PSR–2 and switches contact PSR–1, and line L5 is now grounded through lines L6, L7, L21, L22, L56, switch PSR–2, lines L53, L54, diode D13, switch S7, lines L9, L10, switch CR6–1, line L11, to terminal T2. The motor 28 then operates and in addition the amplifier 30 is energized through the lines L12, L13.

Memory relay CR3 is latched to establish the position at which the transducer carrier is to be located. This is accomplished through a circuit from terminal T1, through lines L1, L2, closed switch 44, lines L3, L14, L49, test bulb TB3, line L50, relay coil CR3, lines L51, L52, diode D12, switch S7, lines L9, L10, relay contact CR6–1, line L11, to terminal T2. A parallel circuit also exists through lamp B7 via the switched contacts PSR–1 and lines L60, L61 and L57. This closes contact CR3–1, establishing a holding circuit through line L22, as soon as relay CR6 is latched.

Relay CR6 is latched through switch S7, through the circuit from terminal T1, line L23, resistor R1, coil CR6, lines L24, L56, contacts PSR–2, lines L53, L54, diode D13, switch S7, lines L9, L10, contacts CR6–1 and line L11 to terminal T2. Latching of relay CR6 connects line L25 to ground, holding relay CR6 and disconnecting the switches S1–S8, from the circuit.

Transducer or pickup 35 is coupled with the amplifier 30, because diode D5 of the circuit 48 is forward biased through line L53 when contact PSR–1 is switched to connect line L53 to line L17, and the silicon diode D4 is not forward biased.

Lamp B7 is energized, first through the relay circuit CR3 and then through the switch 42 when its arm is stepped to contact 42–3. Thus, initially, the circuit is established from terminal T1, through lines L1, L2, L17, contacts PSR–1, lines L60, L61, L57, lamp B7, lines L50, L58, contact CR3–1, and lines L59 and L22. When switch 42 reaches contact 3, the circuit through line 50 is shunted to line L5, providing continuous energization to the lamp B7, the memory relay CR3 dropping out.

Pulsing relay CR5 is energized as in the previous example, to pulse the solenoid SOL1, moving the transducer carrier and the arm of switch 42. This advances the transducer 35 across the tape, until it reaches the position where the arm of switch 42 closes with contact 42–3, the relay CR3 then dropping out, breaking the circuit to relay CR5 through contact CR3–1, and stopping further movement of the transducers.

The recorded message on the tape opposite the pickup 35 is then amplified and emitted by the speaker 38 to broadcast the message associated with the product selected by switch S7.

Figure 4:
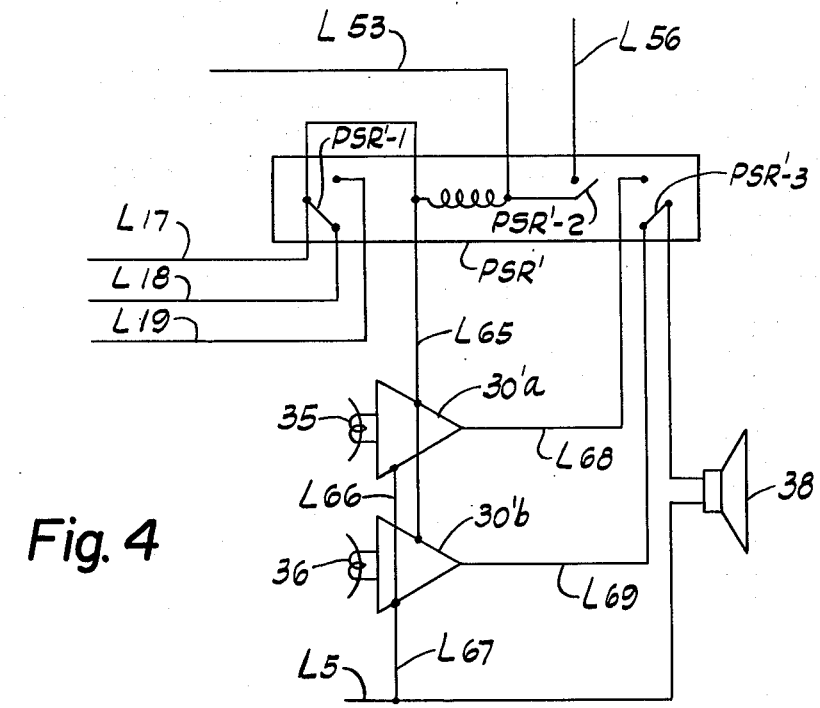
FIG. 4 is a partial circuit diagram showing an alternative embodiment that utilizes a modified stereo two-channel tape player.

A modification of the pickup and amplifier circuit 48 is shown in FIG. 4. The modified circuit is connected through the lines indicated by common reference numerals. A modified pickup selector relay PSR' is provided, with an additional set of contacts PSR'–3 that switches a speaker 38 between one of two amplifiers 30'a, 30'b. These amplifiers are connected to terminal T1 through lines L65 and L17, and to ground via lines L5, through lines L66 and L67. The two amplifiers correspond to the standard stereo amplifier arrangement found in 8-track stereo tape players, but the circuit has been modified through the contacts PSR'–3, to utilize only a single speaker, since the tracks of the tape are not used to produce stereo sound, but rather eight separate monaural messages.

Circuit components of the diagram of FIG. 3 having the following values have been found suitable:

All diodes – 1 amp, 50 peak inverse volts;
Memory relays CR1, 2, 3, 4 and relay PSR –
12 volts, with 300 ohms coil resistance;
Relays CR5 and 6 – 6 volt, 68 ohms coil resistance;
Capacitor C1 – 1,000 microfarads, 16 volts;
Resistors R1 and R2 – 68 ohms, 2 watts;
Lamps B1–B8 and Tb1–TB4 – number 67 bulbs.

Figure 5:
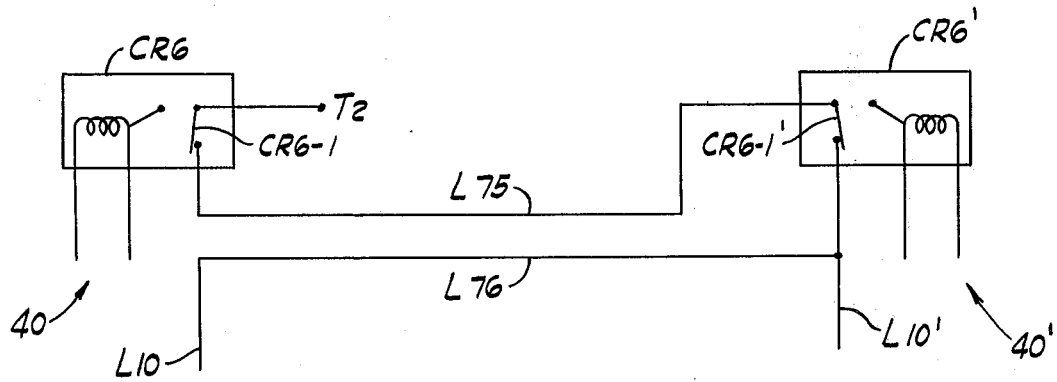
FIG. 5 is a partial circuit diagram illustrating the manner in which two tape players can be connected to increase the number of messages that can be selected.

A manner of connecting two circuits 40 of FIG. 2 for doubling the number of messages that can be selected is shown in FIG. 5 of the drawings. Basically, two similar circuits are interconnected through the contacts CR6–1 of each, placing those contacts in series, so that when they are switched to establish a holding circuit for the relays CR6 and to disconnect the selectors S1–S8 from the system, the opening of either set of relay contacts will eliminate the switches S1–S8 of both circuits from the system. Thus, as shown in FIG. 5, a line L10 of circuit 40 has been broken adjacent the relay CR6, and a line L75 taken from the contact side of the contacts CR6–1 and connected to the actuated side of a contact CR6–1' of a relay CR6' of a circuit 40' corresponding to circuit 40. A line L76 is connected to the line L10 and connected with a line L10' of the circuit 40'. Both lines L10 and L10' connect to the common line L9 (and a corresponding line L9', not shown, of the circuit 40') associated with the selectors S1–S8 of each circuit. The line L76 also connects to the contact side of the relay CR6'. Thus, to complete the circuit from line L10 of circuit 40 to the terminal T2, a complete circuit must be provided through the contacts of relay CR6' of the slave unit 40'. Accordingly, if a selector of the slave unit 40' has been actuated, the contacts CR6–1' will be opened, isolating all contacts associated with line L10 of the master unit 40. Conversely, if a selector of the master circuit 40 is actuated, the contact CR6–1 will be opened, isolating the common line L10' of the slave unit from the terminal T2. There is no ground terminal in the slave unit 40' corresponding to terminal T2 of circuit 40.

From the above description, examples and modifications, it will be apparent that a system has been provided for selecting one of a plurality of messages without regard to the location of the message on a medium. The message can be quickly selected (typically in less than one second) by changing the positional relationship of a transducer to the medium, and playing a recorded message. Simultaneously, a visual indication is made, both the message and the visual indication relating to a particular switch correlated with one of a plurality of products, items, or the like.

While preferred embodiments of the invention have been disclosed in detail, various modifications or alterations may be made therein, without departing from the spirit and scope of the invention set forth in the appended claims.

What is claimed is:

1. An audio-visual display system especially useful for displaying and promoting the sale of products, comprising:

a support for displaying a plurality of products, a plurality of individual means to separately produce visually perceivable outputs, a single information storage medium with a surface carrying a plurality of separate audio messages at different locations, means including a plurality of actuatable selectors each associated with different support locations for displayed products, a different stored message, and a different visually perceivable output, and circuit means associated with each selector and operative to select any one of a plurality of messages recorded at different locations on said surface and an accompanying visible effect responsive to actuation of any one of said selectors, means responsive to actuation of any one of said selectors to emit a selected message and to produce an accompanying visible effect, and means operable in response to actuation of any one of said actuatable selectors to prevent an actuation of a second selector from selecting a message while a message is being emitted.

2. An audio-visual display system especially useful for displaying and promoting the sale of products, comprising:

a support for displaying a plurality of products, a plurality of individual means to separately produce visually perceivable outputs, a single information storage medium having a plurality of separate messages carried by a single surface, means, including a transducer sensitive to messages stored by said medium and an audio emitter operatively associated with said transducer, to emit an audible message stored by said medium, means, including a plurality of actuatable selectors each associated with different support locations for displayed products, a different stored message, and separate means to produce a visually perceivable output, for changing the transducer-to-medium positional relationship and energizing selected means to produce visually perceivable output, and circuit means associated with each selector and operative to select and emit one of a plurality of messages recorded on the medium, the selection being without regard to the order of the recorded messages one to the others on the medium, and to produce an accompanying visible effect responsive to actuation of any one of said selectors, and means operable in response to actuation of any one of said actuatable selectors to prevent a change in the transducer-to-medium positional relationship after one selector is actuated and until said emitting means is deenergized, said individual means to produce a visually perceivable output being lamps adapted to illuminate different displays correlated with the transducer-to-medium positional relationship whereby the message emitted relates to an illuminated display.

3. A system as set forth in claim 2 wherein the message storage medium is a magnetic tape loop with plural tracks and a separate message is carried by each track, said means to emit a message includes means to move the transducer relative to the tracks of the tape loop in response to a single actuation of a selector to select a message, an amplifier and a speaker for reproducing the message audibly, and an electrical circuit, the condition of which is responsive to the actuated selector and to the position of the transducer, to control the movement of the transducer relative to the tracks of the tape loop, whereby the transducer will be automatically positioned by said means to emit a message on the tape loop correlated with the actuated selector.

4. A system as set forth in claim 3 wherein a plurality of transducers are provided, and including means to selectively control operation of each in response to actuation of a selector so each can sense a tape track but fewer than all will cause a message to be emitted.

5. An audio-visual product display system, comprising:

a support for displaying a plurality of products, lamps corresponding with each product and energizeable for producing an illuminated display, a plurality of selectors, one selector corresponding with each product, actuatable to cause a message to be broadcast and a lamp to be energized both related to the product corresponding to the actuated selector, means to select in any order and broadcast a different one of a plurality of messages on a single message carrier in response to actuation of each selector, and means operable in response to actuation of a single one of said actuatable selectors to prevent actuation of a second selector from selecting a message while a message is being broadcast.

6. A system as set forth in claim 5, wherein the lamps and selectors are carried by the support and said support includes means associated with said lamps to be illuminated thereby.

7. A system as set forth in claim 6 wherein said means associated with said lamps are translucent screens on said support displaying visual messages when illuminated.

8. A system as set forth in claim 5 wherein said message carrier in an 8-track tape loop with a separate message on different tracks, and said means to select and play messages is a magnetic audio tape player with two signal pickups movable together relative to the tape tracks to detect the messages on different tracks and with a stepping switch that indicates the presence of the pickups at different locations, and wherein said system further includes a control circuit responsive to actuation of a selector to move said pickups to said different locations and responsive to the indication from said stepping switch that the pickups are at the selected location to stop said movement.

9. A system as set forth in claim 8 wherein the lamps and selectors are carried by the support and translucent screens are carried by said support associated with said lamps displaying visual messages when illuminated.

10. An audio-visual display system for selecting and emitting any one of a plurality of recorded groups of information and for producing an accompanying visible effect, especially useful for displaying and promoting the sale of products, comprising:
 a support for displaying a plurality of products,
 a transducer carried by said support sensitive to information recorded on a medium that has a surface relatively movable with respect to the transducer,
 a plurality of manually operable selectors on the support each associated with a different part of the display for individually selecting a different positional relationship between the transducer and said surface to select one of a plurality of recorded groups of information located at different places on said surface,
 means associated with the transducer responsive to actuation of any one of said selectors to emit information received by the transducer,
 means responsive to a single operation of any one said selector to move one of the transducer and the information-carrying surface relative to the other to establish the selected positional relationship, to energize said emitting means, to produce an accompanying visible effect applicable to that portion of the display with which said one selector is associated, and to prevent an additional selection of a recorded group of information during the emitting of a previously selected group.

11. An audio-visual display system for selecting and emitting any one of a plurality of recorded groups of information and for producing an accompanying visible effect, especially useful for displaying and promoting the sale of products, comprising:
 a support for displaying a plurality of products,
 a plurality of transducers sensitive to information recorded on a medium that has a surface relatively movable with respect to the transducers,
 means including a plurality of selectors each manually operable and associated with the display, to individually select through a single change in the condition of a selector one of said transducers and one of a plurality of available positional relationships between the transducers and said surface, whereby one of a plurality of recorded groups of information located at different places on said surface is selected,
 means associated with the transducers, operative in response to actuation of any one of said selectors, to emit information received by the selected transducer, and
 means responsive to a single operation of one of said selectors to energize said emitting means, and to produce an accompanying visible effect applicable to that portion of the display with which said one selector is operatively associated.

12. A system as set forth in claim 11 including means operable in response to a single change in the condition of a selector to prevent selection of a recorded group of information during the emitting of a previously selected group.

13. An audio-visual display system for selecting and emitting any one of a plurality of recorded groups of information and for producing an accompanying visible effect, comprising:
 transducer means sensitive to information recorded on a medium,
 a plurality of selectors each for individually selecting one of a plurality of recorded groups of information on said medium,
 memory elements electrically operated in response to said selectors to temporarily store an indication of the selection, the memory elements being fewer in number than the selectors,
 means to electrically scan the memory elements to retrieve the selection,
 means to cause the selected group of information to be emitted, and
 means to produce an accompanying visible effect.

14. A system as set forth in claim 13 wherein said memory elements are relays at least some of which are operated by more than one selector and wherein each selector further controls a switch that distinguishes selectors that operate the same relay.

15. An audio-visual display system for selecting and emitting any one of a plurality of recorded groups of information and for producing an accompanying visible effect, comprising:
 transducer means sensitive to information recorded on a medium,
 a plurality of selectors each for individually selecting, through a single change in condition, one of a plurality of recorded groups of information located at different places on said medium, and
 means responsive to a single actuation of one of said selectors, including (a) memory elements, fewer in number than the number of selectors, each of which changes condition in response to actuation of a selector and at least some of which change condition in response to actuation of more than one of said selectors, (b) a second control operated by said selectors, and (c) means responsive to both the condition of said memory elements and the second control, to cause information from one of said recorded groups to be emitted.

16. A system as set forth in claim 15 including means to prevent selection of a recorded group of information during the emitting of a previously selected group.

17. An audio-visual display system comprising:
 a plurality of individual means to separately produce visually perceivable outputs,
 a plurality of information storage media each with a surface carrying a plurality of separate audio messages at different locations,
 separate transducers for each medium sensitive to recorded information,
 means, including a plurality of actuatable selectors each indicative of a different stored message and of a different visually perceivable output, to select and emit one of a plurality of messages recorded on said media at different locations on said surfaces and to produce an accompanying visible effect, the selection being independent of the relative locations of the recorded messages one to the others on the media, and
 means to prevent the selection of a message on any of said media during the emitting of a previously selected message.

18. An audio-visual product display system, comprising:
- a support for displaying a plurality of products,
- lamps corresponding with each product and energizable for producing an illuminated display,
- a plurality of selectors, one selector corresponding with each product, actuatable to cause a message to be broadcast and a lamp to be energized, both related to the product corresponding to the actuated selector,
- means to select and play a different one of a plurality of messages on a plurality of message carriers in response to actuation of each selector,
- each said message carrier being an 8-track tape loop with separate messages on different tracks,
- said means to select and play messages including a magnetic audio tape player for each message carrier, each tape player having two signal pickups movable together relative to the tape tracks to detect the messages on different tracks and with a stepping switch that indicates the presence of the pickups at different locations,
- a control circuit responsive to actuation of a selector to move the pickups of one of said tape players to a different location and responsive to the indication from the stepping switch of that player that the pickups are at the selected location, to stop said movement, and
- control means to prevent selection of a different message on any of said message carriers until the playing of an already selecting message has been completed.

19. A system as set forth in claim 18 wherein the lamps and selectors are carried by the support and translucent screens are carried by said support associated with said lamps displaying visual messages when illuminated.

20. An audio-visual display system especially useful for displaying and promoting the sale of products, comprising:
- a support for displaying a plurality of products,
- a plurality of individual means to separately produce visually perceivable outputs,
- a single information storage medium having a plurality of separate messages carried at different locations on a single surface,
- means, including a transducer sensitive to messages stored by said medium and an audio emitter operatively associated with said transducer, to emit an audible message stored by said medium, and
- means, including a plurality of actuatable selectors each associated with different support locations for displayed products and each indicative of a different stored message and of a separate means to produce a visually perceivable output related to the associated support location, for changing the transducer-to-medium positional relationship and energizing selected means to produce visually perceivable output, to select and emit one of a plurality of messages recorded on the medium, the selection being without regard to the order of the recorded messages one to the others on the medium, and to produce an accompanying visible effect,
- said means to emit an audible message further including an electrical circuit, the condition of which is responsive to the actuated selector and to the transducer-to-medium positional relationship, to control any change in said positional relationship necessary to establish between the transducer and medium a transducer-to-medium position that will emit a message on the medium correlated with the selecting switch.

21. A system as set forth in claim 20 wherein a plurality of transducers are provided, and including means to selectively control operation of each in response to actuation of a selector so each can sense a message but fewer than all will cause a message to be emitted.

22. In an audio-visual product display,
- a support for displaying a plurality of products,
- lamps corresponding with each product and energizable for producing an illuminated display,
- a plurality of selectors, one selector corresponding with each product, actuatable to cause a message to be broadcast and a lamp to be energized, both related to the product corresponding to the actuated selector,
- means to select in any order and broadcast a different one of a plurality of messages on a message carrier in response to actuation of each selector,
- said means including plural signal pickups movable together relative to the message carrier to detect messages at different locations and a switch that indicates the presence of the pickups at different locations, and
- a memory and comparator circuit connected with said switch and including means energizable to move said pickups, memory elements the conditions of which are controlled by selectors and which are indicative of the location to which the transducer must be moved to broadcast the message relating to the actuated, selector, means to select which of said plural signal pickups to utilize, means to move the message carrier relative to the pickups, switch means operable after actuation of a selector to disconnect the selectors from the circuit, means to compare the condition of said switch that indicates the presence of the pickups at different locations with the condition of the memory elements and to stop movement of the pickups when they are at the location for which the condition of the memory elements is indicative, and means to activate a lamp corresponding to the product related to the actuated selector.

* * * * *